Patented Jan. 27, 1942 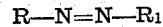 2,271,220

UNITED STATES PATENT OFFICE 2,271,220

AZO COMPOUND AND MATERIAL COLORED THEREWITH

Joseph B. Dickey and John R. Byers, Jr., Rochester, N. Y., assignors to Eastman Kodak Company, Rochester, N. Y., a corporation of New Jersey No Drawing. Application February 2, 1940, Serial No. 317,007

1 Claim. (Cl. 260—205)

This invention relates to the art of dyeing or coloring. More particularly, it relates to new azo dye compounds and the application of the nuclear non-sulfonated compounds for the coloration of organic derivatives of cellulose; especially textile materials made of or containing an organic derivative of cellulose by dyeing, printing, stenciling or like methods.

Organic derivatives of cellulose are characterized by an indifferent affinity for the usual cotton and wool dyes especially the ordinary water soluble dyes. Because of this, it has been necessary to develop new dye compounds suitable for the dyeing or coloration of materials, such as textile materials, made of or containing an organic derivative of cellulose. It is, accordingly, an object of our invention to provide a new class of azo dyes suitable for the dyeing or coloration of organic derivatives of cellulose. Another object is to provide a process for the coloration of organic derivatives of cellulose in which the dye or dyes are applied directly from an aqueous suspension to the material undergoing coloration. A further object is to produce dyeings on organic derivatives of cellulose which are of good fastness to light and washing. Other objects will hereinafter appear.

Typical organic derivatives of cellulose include the hydrolyzed as well as the unhydrolyzed cellulose organic acid esters such as cellulose acetate, cellulose formate, cellulose propionate, or cellulose butyrate and the hydrolyzed as well as the unhydrolyzed mixed organic acid esters of cellulose such as cellulose acetate-propionate, cellulose acetate-butyrate, and the cellulose ethers such as methyl cellulose, ethyl cellulose, or benzyl cellulose. While our invention will be illustrated more particularly in connection with the coloration of cellulose acetate, a material to which the invention is especially adapted, it will be understood that it applies to the coloration of other organic derivatives of cellulose such as those just mentioned.

The azo dye compounds of our invention, broadly speaking, have the general formula:

$$R—N=N—R_1$$

wherein R represents the residue of an aryl nucleus and $R_1$ represents the residue of a 1,4-dihalogen-2-aminobenzene joined directly to the azo bond shown.

While our invention relates broadly to the azo dye compounds having the above formula it relates more particularly to the azo dye compounds having the general formula:

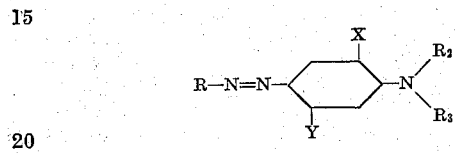

wherein R represents the residue of an aryl nucleus, $R_2$ and $R_3$ each represents hydrogen, an alkyl group, a cycloalkyl group, an aralkyl group or a furyl group and X and Y each represents a halogen atom. Advantageously R is the residue of an aryl nucleus of the benzene series containing but one benzene ring.

It will be understood that alkyl, as used herein, unless otherwise indicated, includes not only unsubstituted alkyl groups such as a methyl group, an ethyl group, a propyl group or a butyl group but also substituted alkyl groups such as β-hydroxyethyl, β-hydroxypropyl, β,γ-hydroxypropyl, γ-hydroxypropyl, β-methoxyethyl, β-ethoxyethyl, β-sulfoethyl, γ-sulfopropyl, β-sulfatoethyl, β-phosphatoethyl or γ-phosphatopropyl, for example. Illustrative of halogen may be mentioned chlorine, bromine and iodine. Illustrative of cycloalkyl may be mentioned cyclobutyl, cyclohexyl and cycloheptyl. Similarly, illustrative of aralkyl may be mentioned benzyl and phenyl ethyl and of furyl, furfuryl, tetrahydrofurfuryl, 5-ethyltetrahydrofurfuryl and 5-β-hydroxyethyltetrahydrofurfuryl.

The azo dye compounds of our invention can be prepared by diazotizing primary arylamines and coupling the diazonium compounds obtained with 1,4-dihalogen-2-aminobenzene compounds.

Suitable primary arylamines that can be employed in the preparation of the azo dye compounds of our invention include, for example, p-nitroaniline, 1-amino-2,4-dinitro-6-chlorobenzene, 1-amino-2-nitro-4-chlorobenzene, 1-amino-2-bromo-4-nitrobenzene, 1-amino-2,4-dinitrobenzene, 1-amino-2,4-dichloro- (or bromo) benzene, p-aminoacetophenone, 1-amino-2,4-dinitro-6-cyanobenzene, 1-amino-2-chloro-4-methylbenzene, 1-amino-2-methyl-4-bromobenzene, 1-amino-2-propyl-4-chlorobenzene, 1-amino-2-nitro-4-ethylbenzene, o-chloro-(bromo)-aniline, o-nitroaniline, p-aminoazobenzene, α-naphthylamine, 1-amino-5-naphthol, 1-amino-4-nitronaphthalene, p-aminobenzophenone, p-aminobenzene-sulfonamide and methyl anthranilate.

Suitable 1,4-dihalogen-2-aminobenzene coupling compounds that can be employed in the preparation of the azo dye compounds of our invention include, for example, 1,4-dichloro-2-ethyl-β-hydroxyethylaniline, 1,4-dibromo-2-cyclohexylaniline, 1-bromo-4-chloro-2-di-β-hydroxyethylaniline, 1,4-dichloro-2-tetrahydrofurfurylaniline, 1,4-dibromo-2-ethyl-benzylaniline, 1-chloro-4-iodo-2-glycerylaniline, 1,4-diiodo-2-β-hydroxyethylaniline, 1,4-dichloro-2-β-methoxyethylaniline, 1,4-dibromo-2-methyl-glycerylaniline, 1,4-dichloro-2-(5-β-hydroxyethyltetrahydrofurfuryl)-aniline, 1,4-dichloro-2-butyl-β-hydroxyethylaniline, 1,4-dichloro-2-sodium-phosphatoethylaniline and 1,4-dibromo-2-β-sulfatoethylaniline.

As previously indicated the nuclear non-sulfonated azo dye compounds of our invention constitute valuable dyes for the coloration of organic derivatives of cellulose such as those hereinbefore mentioned yielding various shades thereon of good fastness to light and washing. These nuclear non-sulfonated dye compounds likewise possess some application for the coloration of wool and silk and yield generally similar shades on these materials as on organic derivatives of cellulose. The nuclear sulfonated compounds of our invention possess little or no utility for the coloration of organic derivatives of cellulose but can be employed to color textile materials such as wool and silk. The nuclear sulfonated compounds can be prepared in known fashion. They can be prepared, for example, by the use of previously sulfonated components or by subsequent sulfonation of the unsulfonated compounds.

The following examples illustrate the preparation of the azo dye compounds of our invention.

Example 1

17.2 grams of p-bromoaniline are dissolved in a mixture of 200 cc. of water and ice to which has been added 25 cc. of 36% hydrochloric acid. The resulting solution is then cooled, if necessary, by the addition of ice, for example, to about 0–5° C. and the p-bromoaniline is diazotized by adding with stirring 6.9 grams of sodium nitrite dissolved in water while maintaining the temperature at about 0–5° C.

25 grams of 1,4-dichloro-2-di-β-hydroxyethylaniline are dissolved in a mixture of 500 cc. of water and 25 cc. of 36% hydrochloric acid and the resulting solution is cooled to a temperature approximating 0–10° C. The diazonium solution prepared as described above is then slowly added with stirring while maintaining a temperature of 0–10° C. The mixture resulting is then slowly made neutral to Congo red paper by the addition of sodium acetate or sodium carbonate. Upon completion of the coupling reaction which takes place the dye compound formed is recovered by filtration, washed with water and dried. The dye compound obtained colors cellulose acetate silk yellow.

Example 2

13.8 grams of p-nitroaniline are diazotized in known fashion and the diazonium compound obtained is coupled with 27.8 grams of 1,4-dichloro-2-γ-hydroxypropylaniline. Coupling and recovery of the dye compound formed can be carried out in accordance with the general method described in Example 1. The dye compound obtained colors cellulose acetate silk orange.

Example 3

26.2 grams of 1-amino-2,4-dinitro-6-bromobenzene are diazotized in known fashion and the diazonium compound obtained is coupled with 37.8 grams of 1-chloro-4-bromo-2-sodium-β-sulfoethylbutylaniline. The coupling reaction is carried out by adding the diazonium solution to the coupling component which is dissolved in a minimum amount of acetic acid. After addition of the diazonium compound the mixture is allowed to stand for an hour after which it is made neutral to Congo red paper by the addition of a base such as sodium acetate. The coupling reaction is carried out while maintaining a temperature of about 0–10° C. Upon its completion, water is added to the mixture and the dye compound formed is salted out, if necessary, by the addition of sodium chloride after which it is recovered by filtration, washed with water and dried. The dye compound obtained colors cellulose acetate silk violet.

Example 4

22.8 grams of 1-amino-2,4,6-trinitrobenzene are diazotized in known fashion and the diazonium compound obtained is coupled with 26 grams of 1,4-dichloro-2-propyl-γ-hydroxypropylaniline, dissolved in acetic acid. Following the addition of the diazonium compound to the acetic acid solution of the coupling component, the mixture is allowed to stand for 30 minutes after which it is made neutral to Congo red paper by the addition of sodium carbonate. Upon completion of the coupling reaction, water is added and the dye compound formed is recovered by filtration, washed with water and dried. The dye compound obtained colors cellulose acetate silk purple.

The following tabulation further illustrates the compounds included within the scope of our invention together with the color they produce on cellulose acetate silk. The compounds indicated below may be prepared by diazotizing the amines listed under the heading "Amine" and coupling the diazonium compounds obtained with the compounds specified in the column entitled "Coupling component." The diazotization and coupling reactions may, for example, be carried out following the general procedure described in Examples 1 to 4, inclusive.

| Amine | Coupling component | Color |
|---|---|---|
| o,m,p-Anisidine | (1) 1,4-dichloro-2-di-β-hydroxyethylaniline | Yellow. |
| Do | (2) 1,4-dichloro-2-glycerylaniline | Do. |
| Do | (3) 1,4-dichloro-2-propyl-γ-hydroxypropylaniline | Do. |
| Do | (4) 1-chloro-4-bromo-2-sodium-β-sulfoethylbutylaniline | Do. |
| Do | (5) 1,4-dibromo-2-cyclohexylaniline | Do. |
| Do | (6) 1,4-dichloro-2-tetrahydrofurfurylaniline | Do. |
| Do | (7) 1,4-dibromo-2-ethylbenzylaniline | Do. |
| Do | (8) 1,4-dichloro-2-β-hydroxyethylaniline | Do. |
| o,m,p-(Br,Cl,F,I)-aniline | Coupling components 1-8 | Orange-yellow. |
| p-Aminoacetophenone | ----do---- | Orange. |
| p-Nitroaniline | ----do---- | Orange-yellow. |
| o-Nitroaniline | ----do---- | Orange. |
| 1-amino-2-(F,Cl,Br,I)-4-nitrobenzene | ----do---- | Do. |
| 1-amino-2-methoxy-4-nitrobenzene | ----do---- | Do. |
| 1-amino-2-ethoxy-4-nitrobenzene | ----do---- | Do. |
| 1-amino-2-methyl-4-nitrobenzene | ----do---- | Do. |
| 1-amino-2,4-dinitrobenzene | ----do---- | Rubine. |
| 1-amino-2,4-dinitro-6-(F, Cl, Br) aniline | ----do---- | Violet. |
| 1-amino-4-nitro-2-methylbenzoate | ----do---- | Orange-red. |
| p-Aminoazobenzene | ----do---- | Orange. |
| 1-amino-4,6-dinitro-2-ethylbenzoate | ----do---- | Violet. |
| 1-amino-2,6-dinitro-4-phenylmethyl ketone | ----do---- | Do. |
| α-naphthylamine | ----do---- | Yellow. |
| 1-amino-nitronaphthalene | ----do---- | Red. |
| p-Aminobenzophenone | ----do---- | Orange. |
| 1-amino-2-chloro-4-nitrobenzene | 1,4-dichloro-2-glycerylaniline | Orange. |

Nuclear sulfonated compounds corresponding to the nuclear non-sulfonated compounds shown herein can be prepared by sulfonating said non-sulfonated compounds or by employing sulfonated diazo components. Sulfonation can be effected for example with chlorosulfonic acid or fuming sulphuric acid. Suitable sulfonated amines which can be diazotized and coupled with any of the coupling components shown herein include, for example, m-sulfanilic acid, p-sulfanilic acid, 1-amino-2-sulfo-4-nitrobenzene, 1-amino-2-nitro-4-sulfobenzene, 1-amino-2-chloro-4-sulfobenzene, 1-amino-2-sulfo-4-bromobenzene and 1-amino-2-sulfonaphthalene.

It will be understood that the specific dye compounds given hereinbefore are intended to be illustrative and not limitative of the invention. Any of the amines disclosed herein may be diazotized and the diazonium compounds obtained coupled with any of the coupling components shown herein to obtain dye compounds included within the scope of our invention.

The 1,4-di-halogen-2-aminobenzene coupling compounds employed in the preparation of the azo dye compounds of our invention can be prepared from 1,4-dihalogen benzene compounds containing a free amino group in the 2 position. The corresponding hydroxyalkylated compounds can be prepared for example by reaction with an alkylene chlorohydrin such as ethylene chlorohydrin, propylene chlorohydrin or butylene chlorohydrin or by reaction with an alkylene oxide such as ethylene oxide or propylene oxide. Unsubstituted alkyl compounds can be prepared by reaction with the corresponding alkyl chloride; methyl chloride, ethyl chloride, propyl chloride and butyl chloride being illustrative of alkyl chlorides. Similarly aralkyl compounds can be prepared by reaction with an aralkyl chloride such as benzyl chloride or phenyl ethyl chloride, while furyl compounds can be prepared by reaction with furyl chlorides such as furfuryl chloride, furoyl chloride and tetrahydrofurfuryl chloride. The 1,4-dihalogen-2-aminobenzene coupling components of our invention can be prepared by any suitable method desired. Other 1,4-dihalogen-2-aminobenzene compounds in addition to those whose preparation has been specifically indicated can be prepared in accordance with the methods known to those skilled in the art.

Both water soluble and water insoluble azo dye compounds are included within the scope of our invention. Those compounds which are insoluble in water may be advantageously employed for the direct dyeing of textile materials by grinding the dye to a fine powder, intimately mixing it with a suitable dispersing or solubilizing agent and adding the resulting mixture to water or a dilute solution of soap in water to form an aqueous dyebath. Following this known preparation of the dyebath, the textile material or materials to be dyed may be added to the dyebath and the dyeing operation conducted in known fashion. For a more complete description as to how the water insoluble azo dye compounds of our invention can be employed for the dyeing of organic derivatives of cellulose, reference may be had to McNally and Dickey U. S. Letters Patent No. 2,115,030, issued April 26, 1938. The water insoluble azo dye compounds of our invention, as previously noted, also possess application for the dyeing of wool and silk and they may be applied to these materials in the same manner as they are applied to organic derivatives of cellulose.

The water soluble dye compounds of our invention may be applied to wool, silk and (depending upon the nature and position of the water solubilizing group) organic derivatives of cellulose textile materials from an aqueous solution of the dye which may contain salt. These water soluble dye compounds can be applied to the fiber in substantially the same manner as the water insoluble dye compounds. In the case of the water soluble dye compounds, however, the use of a dispersing or solubilizing agent is not necessary. It will be understood, of course, that the above remarks concerning the application of the dye compounds of our invention to textile materials are merely illustrative and that any of the customary methods for applying dyes of the character here involved can be employed.

We claim:

The azo dye compound having the formula:

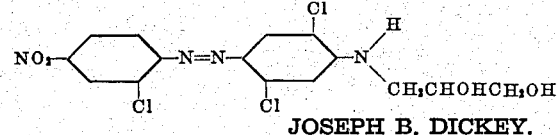

JOSEPH B. DICKEY.
JOHN R. BYERS, Jr.